United States Patent [19]

Kazuro et al.

[11] Patent Number: 5,692,585
[45] Date of Patent: Dec. 2, 1997

[54] BRAKE PAD WITH A WEAR INDICATOR

[75] Inventors: Jean M. Kazuro, Sarcelles; Jean-Pierre N. Caron, Cuts; Alain B. Deguise, Noyon, all of France

[73] Assignee: Ferodo Abex SA, Noyon, France

[21] Appl. No.: 776,248

[22] PCT Filed: Aug. 2, 1995

[86] PCT No.: PCT/GB95/01830

§ 371 Date: Jan. 24, 1997

§ 102(e) Date: Jan. 24, 1997

[87] PCT Pub. No.: WO96/05448

PCT Pub. Date: Feb. 22, 1996

[30]  Foreign Application Priority Data

Aug. 8, 1994 [FR] France ................ 9409798

[51] Int. Cl.$^6$ ........................................ F16D 66/02
[52] U.S. Cl. .............................. 188/1.11; 340/454
[58] Field of Search ........................ 188/1.11 WE, 188/1.11 E, 1.11 R, 1.11 W, 1.11; 340/454; 116/208; 192/30 W

[56]  References Cited

U.S. PATENT DOCUMENTS

| | | | |
|---|---|---|---|
| 3,553,643 | 1/1971 | Maras | 340/454 |
| 3,783,979 | 1/1974 | Hess | 188/1.11 WE |
| 3,967,167 | 6/1976 | Scharrer et al. | |
| 3,976,167 | 8/1976 | Hirai et al. | 188/1.11 WE |
| 3,986,164 | 10/1976 | Hirai et al. | 188/1.11 WE |
| 4,318,457 | 3/1982 | Dorsch et al. | 188/1.11 WE |
| 4,391,350 | 7/1983 | Moriya | 188/1.11 WE |
| 4,456,098 | 6/1984 | Lindre | 188/1.11 WE |
| 4,832,160 | 5/1989 | Fargier et al. | 188/1.11 WE |
| 4,890,697 | 1/1990 | Fischer et al. | 188/1.11 WE |
| 5,503,251 | 4/1996 | Lin | 188/2 D |

FOREIGN PATENT DOCUMENTS

| | | |
|---|---|---|
| 2385950 | 10/1978 | France . |
| 2465924 | 3/1981 | France . |
| 2513716 | 4/1983 | France . |
| 2567601 | 1/1986 | France . |
| 2619348 | 2/1989 | France . |
| 2647868 | 12/1990 | France . |

*Primary Examiner*—Douglas C. Butler
*Attorney, Agent, or Firm*—Nixon & Vanderhye, P.C.

[57]  ABSTRACT

The invention relates to a brake pad (1) having a wear indicator (5). The brake pad (1) has a first bore (20) opening out into the braking face (4) of the friction lining (2), a second bore (22) opening out into the first bore (20) and into the edge (23) of the lining, and a slot (24) which extends between the first bore (20), the second bore (22), the edge (23), and the braking face (4). The indicator (5) comprises a pellet (6) adapted to the first bore (20), a sleeve (14) slidably mounted on the conductors (12a, 12b) of the indicator (5) and urged against the pellet (6) by a resilient sheath (16) that bears against the connection terminal (15) of the indicator (5). The diameter of the sleeve (14) is substantially equal to the diameter of the second bore (22). The slot (24) serves to pass the conductor wires (12a, 12b) during installation of the indicator (5) on the brake pad (1), after the sleeve (14) has been moved away from the pellet (6).

9 Claims, 4 Drawing Sheets

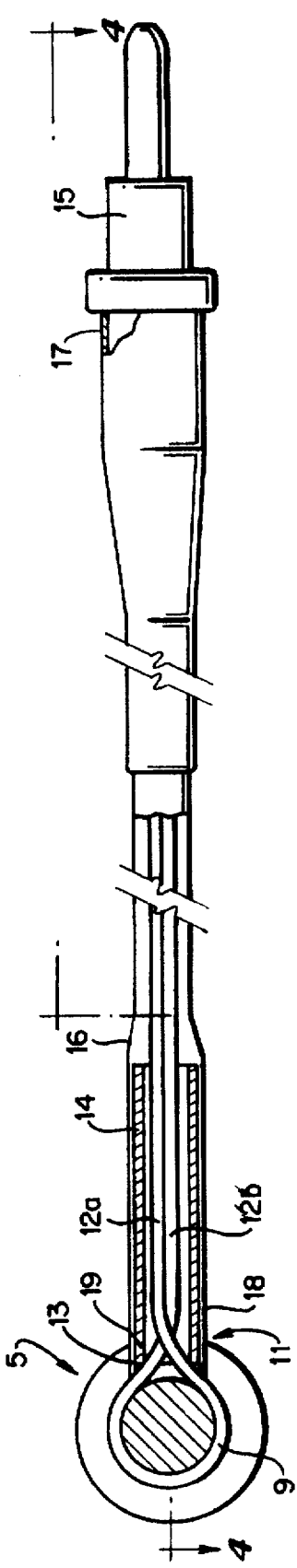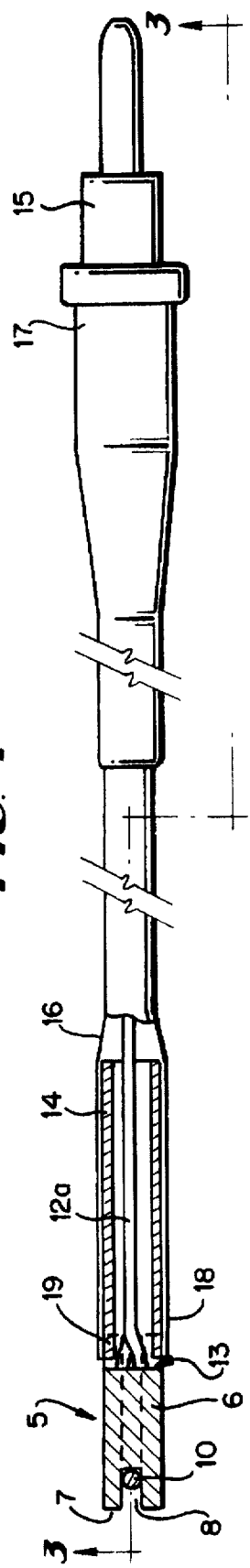

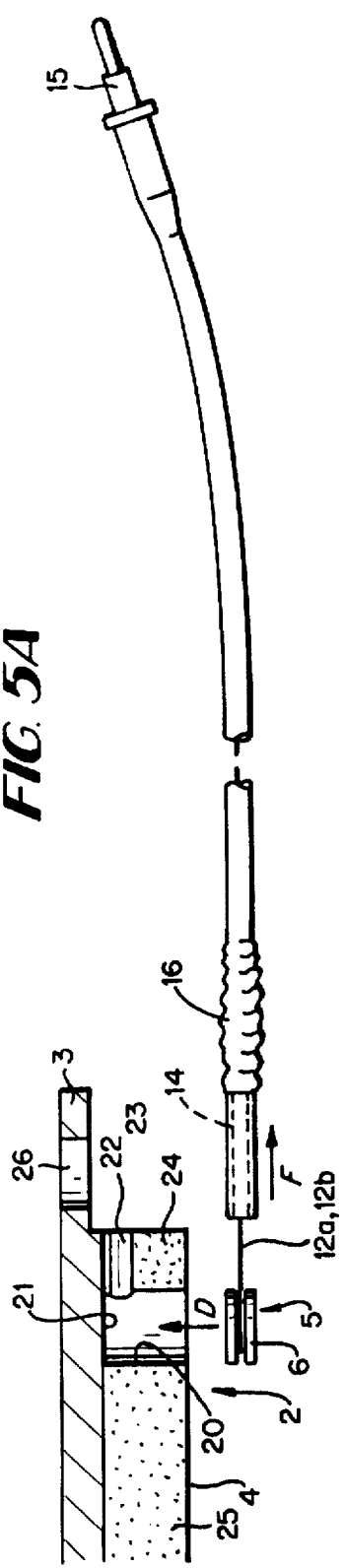
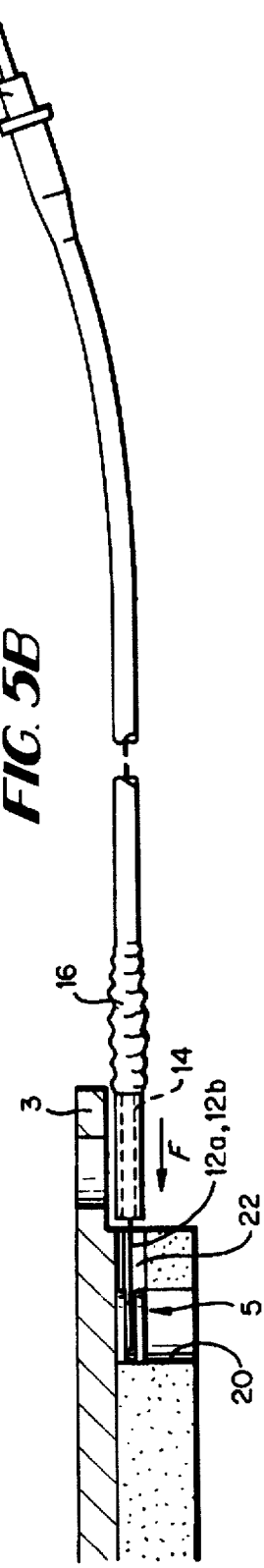
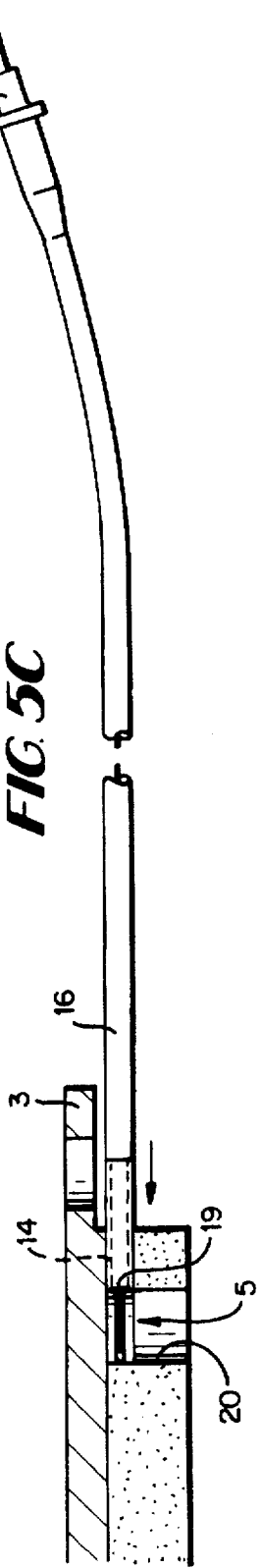

BRAKE PAD WITH A WEAR INDICATOR

The present invention relates to a brake pad for a vehicle brake, the pad comprising a friction lining and a wear indicator fixed thereto, said indicator comprising a body of insulating material and an electrical conductor designed to be connected to an electrical indicator circuit, a portion of said conductor being disposed in said body in such a manner that it is itself worn by a rotary part of the brake once the friction lining has been reduced to a thickness of less than a predetermined value.

Brake pads are often fitted with indicators that are insulated from ground. Such indicators cause a warning light on the dashboard of the vehicle to light up as soon as they come into contact with the disk or rotary part that is connected tog round.

In general, the body of a wear indicator comprises a stud that is pluggable in an opening formed in a support plate for the friction lining in a region that has no lining, either via the face that faces the rotary part, or else via the opposite face. The state of the art is illustrated by FR-A-2,385,950, FR-A-2,513,716, FR-A-2,567,601, FR-A-2,647,868 and FR-A-2,619,348. Under such circumstances it is necessary to provide means for preventing axial displacement of the stud; either flanges or snap-fastening means.

A wear indicator is also known from FR-A-2,465,924 in which the body is applied to the support plate for the friction lining.

U.S. Pat. No. 3,967,167 provides for the wear indicator being received in a hole opening out to that face of the lining support which is remote from the rotary part and for the indicator to be held therein by a wedging plate which is snap-fastened on said support face.

All of those devices require either indicator bodies that are complex in shape, or else additional parts that serve to hold the indicator on the brake pad. In addition, installing such elements is complicated and requires special tools, and dismounting the indicator is difficult or even impossible.

Wear indicators are also known that are fixed into the friction lining by means of adhesive. However, such indicators are subjected to high temperatures during braking. Such increases in temperature can loosen the indicator relative to the lining. In addition, once an indicator has been fixed in this way, it cannot be recycled when changing the brake pads of the vehicle, even if it has not itself been worn.

An object of the present invention is to provide a brake pad of The above-mentioned type in which it is easy to install the indicator.

According to the invention, the proposed brake pad is characterised by the fact that the body is shaped to be received in the bottom of a first blind bore formed in the friction lining and opening out into the braking face of said lining, by the fact that the means for fixing the indicator on said lining comprise a rigid sleeve slidably mounted on the electrical conductor in the vicinity of said body and suitable for being received in a second bore formed in said lining and opening out into said first bore and to one of the edges of the lining, and by the fact that a slot is provided in the friction lining to pass the electrical conductor during installation of the wear indicator on said lining, said slot being narrower than the diameter of the sleeve and extending between said first bore, said second bore, said edge, and said braking face.

Because of this disposition, the wear indicator is installed without using a tool and without using adhesive, it suffices to move the sleeve away from the body, and to slide the body into the first bore, while passing the conductor via the slot. Once the body reaches the end of the first bore, the conductor is centered in the second bore and it suffices to move the sleeve back toward the body, causing it to penetrate into the second bore. This locks the body in the end of the first bore. Removal of the indicator is performed in the reverse order. The sleeve is caused to slide along the conductor until it comes out from the second bore, after which the body is removed from the first bore, by causing the conductor to pass though the slot. In the event of the body being worn by the rotary part, the body is held in the end of the first bore. This makes it possible to guarantee that the warning signal functions when the friction lining reaches a specified thickness that is less than a predetermined value.

Advantageously, means are provided for holding the sleeve in the second bore. These means comprise a resilient sheath suitable for sliding on the electrical conductor and exerting via one of its ends, a force on the sleeve. This force is directed towards the body and the other end of the sheath bears against the plug fitted to the conductor for the purpose of connection to the electrical circuit of the indicator.

The body of the indicator is advantageously in the form of a pellet. In a preferred embodiment, the pellet includes an annular groove in its periphery and the electrical conductor is an insulated conductor wire having a loop received in the groove.

Other advantages and characteristics of the invention appear on reading the following description given by way of example and made with reference to the accompanying drawings, in which:

FIG. 3 is a section on a larger scale on line III—III of FIG. 4 showing the wear indicator of the invention adapted to the brake pad of FIG. 1;

FIG. 4 is a section on a larger scale on line IV—IV of FIG. 3, showing the wear indicator of the invention;

FIGS. 5A, 5B and 5C show different stages in installing the wear indicator of FIGS. 3 and 4 on the brake pad of FIGS. 1 and 2.

Figure 1:
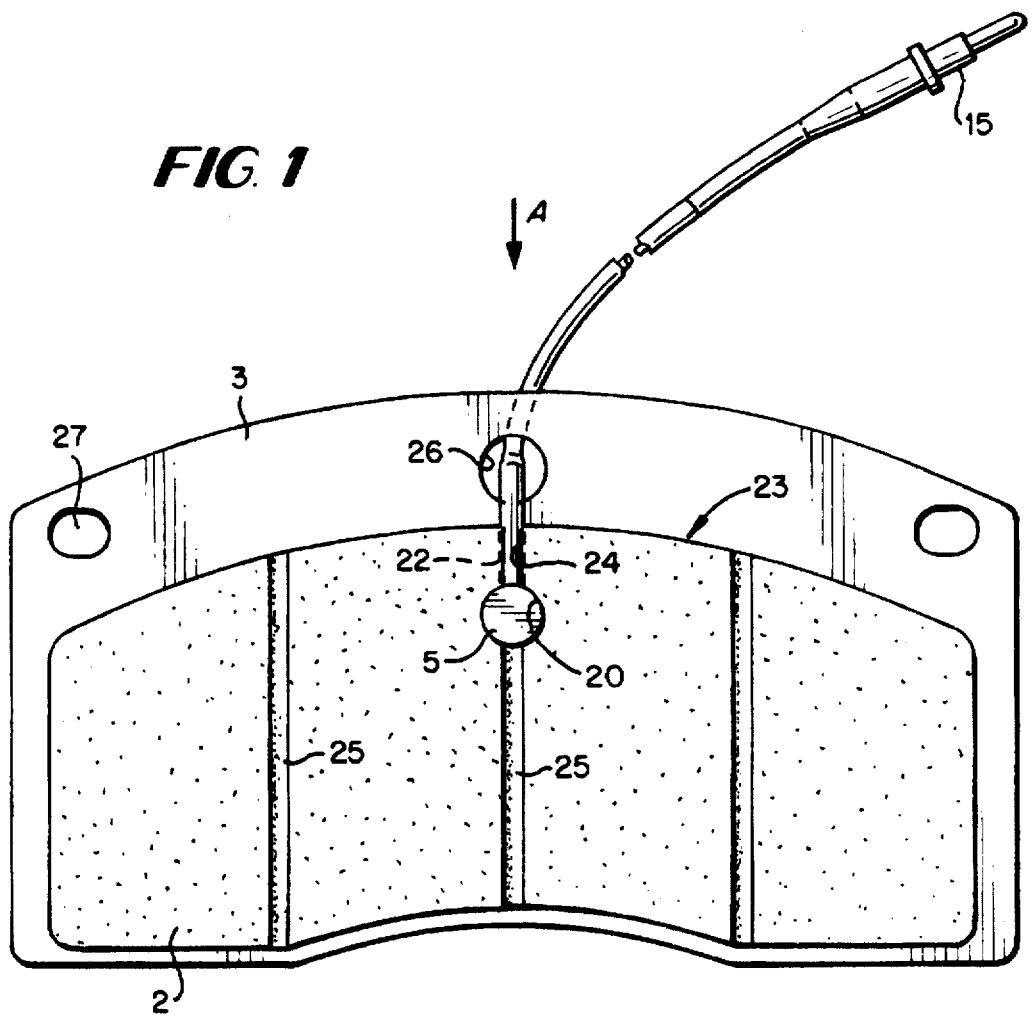
FIG. 1 is a view of a brake pad showing the braking face that is intended to co-operate with a rotary part.

In the drawings, reference 1 designates a brake pad for a disk brake, the pad comprising a friction lining 2 mounted on a support plate 3. The lining 2 has a braking face 4 that is designed to co-operate by friction with a disk that is associated with a wheel axle of a vehicle. The brake pad is fitted with a wear indicator 5 which is described in detail below.

As can be seen in FIGS. 3 and 4, the wear indicator 5 comprises a body constituted by a pellet 6 of insulating material having a groove 8 in its periphery 7 in which a loop 9 of an insulated conductor wire 10 is received.

In the zone 11 of the pellet 6, from which two lengths of wire 12a and 12b project, extending the loop 9, there is provided a recess 13 for a purpose that is explained below.

In the vicinity of this zone 11, a rigid sleeve 14 is provided which is capable of sliding over the lengths of wire 12a and 12b. The ends of the lengths of wire 12a and 12b are fixed to as plug 15 for the purpose of connecting the conductor wire 10 to an electrical circuit for indicating wear of the lining 2, said indicator circuit being constituted, for example, by an indicator light mounted on the dashboard of the vehicle, or by an audible warning device. Between the plug 15 and the sleeve 14, there is provided a resilient and watertight sheath 16 having one end 17 secured to the plug 15 and having its other end 18 preferably overlying at least a portion of the sleeve 14. The purpose of the sheath 16 is to exert a force on the sleeve 14 that is directed towards the pellet 6 so that the end 19 of the sleeve 14 which is remote from the plug 15 tends to be received in the recess 13 of the pellet 6.

Figure 2:
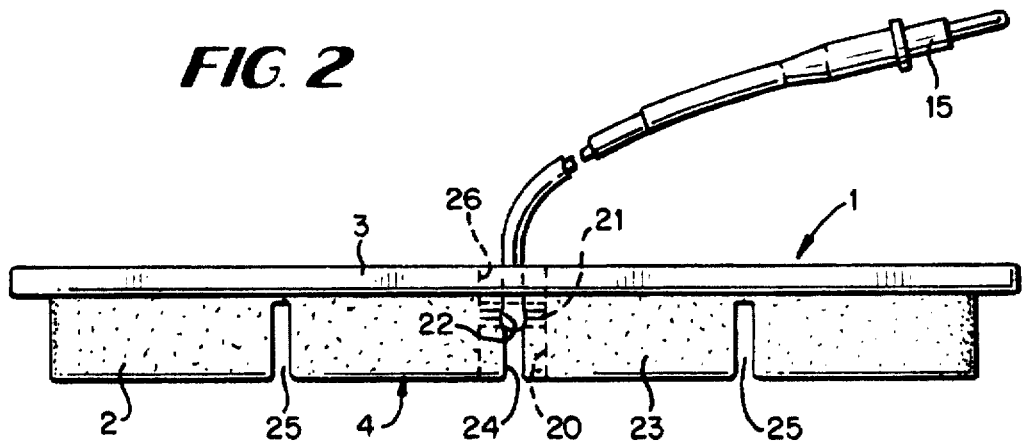
FIG. 2 is a plan view of the FIG. 1 brake pad as seen in the direction of arrow A in FIG. 1.

As can be seen in FIGS. 1 and 2, and in FIGS. 5A, 5B and 5C, the lining 2 has a first blind bore 20 which opens out in the braking face 4, and whose end wall 21 is advantageously constituted by the support plate 3. A second bore 22 connects the first bore 20 to the edge 23 of the lining 3. This second bore 22 opens out into the first bore 20 in the vicinity of its end wall 21. The lining 2 also includes a slot 24 which extends between the first bore 20, the second bore 22, the edge 23, and the braking face 4. It optionally includes other slots 25 for facilitating cooling of the lining 2, should that be considered necessary given the use for which pad 1 is intended.

The dimensions of the first bore 20 are designed so that the pellet 6 is capable of passing into said first bore 20.

The diameter of the second bore 22 is substantially equal to the diameter of the sleeve 14 covered in its resilient sheath 16. The width of the slot 24 is less than the diameter of the sleeve 14 and slightly greater than the thickness of the conductor wire 10.

The wear indicator 5 is mounted on the brake pad 1 in the manner shown in FIGS. 5A, 5B, and 5C.

As can be seen in FIG. 5A, the operator presents the pellet 6 to the orifice of the first bore 20, manually pulling the sleeve 14 away from the pellet 6 by exerting a force F on the sleeve 14 that compensates the opposing force exerted by the resilient sheath 16. The lengths of wire 12a and 12b are placed facing the slot 24. Thereafter, it suffices to displace the indicator 5 in the direction of arrow D.

Once the pellet has been placed in the end 21 of the first bore 20, as shown in FIG. 5B, the lengths of wire 12a and 12b are substantially in the centre of the second bore 22. To lock the pellet 6 in the first bore 20, the operator then releases the sleeve 14. The sheath 16 then exerts a force F on the sleeve 14, which force is directed towards the pellet 6. The sleeve 14 penetrates automatically into the second bore 22. Where necessary, the operator may apply additional force to the sleeve 14 by pressing it with a finger so as to cause it to press against the pellet 6.

FIG. 5C shows the sleeve 14 locked in.he second bore 22 at the end of the assembly operation. The end 19 of the sleeve 14 is received in the recess 13.

The wear indicator 5 operates as follows: when, because of wear, the lining 2 is of a thickness that is less than the thickness of the pellet 6, the rotary part of the brake wears away the material of the pellet. There comes a moment when the loop 9 is itself subjected to wear, so that conductor wire 10 is then electrically connected to the rotary part while braking is taking place. Since the rotary part is connected to ground, the electrical indicator circuit is closed.

When changing brake pads 1, it is possible to reuse the wear indicator 5 of the invention if its pellet 6 has not itself been worn. Under such circumstances, it suffices to extract the sleeve 14 from the second bore 22 and to withdraw the pellet 6 from the first bore by causing the lengths of wire 12a and 12b to pass through the slot 24.

The through hole 26 in the support plate 3 serves to pass the lead of the indicator 5. The holes 27 serve to mount the brake pad on the brake calliper.

In the embodiment described above, the end 18 of the resilient sheath 16 covers at least a portion of the sleeve 14. Clearly the end 18 of the sheath 16 could merely press against the outer end of the sleeve 14. Similarly, the loop 9 could be replaced by a terminal embedded in the mass of the pellet 6, with the lengths of wire 12a and 12b being electrically connected thereto. Under such circumstances, the pellet 6 no longer has grooves 8 and the recess 13 may be omitted. Similarly, the holes 26 and 27 of the support plate 3 are not essential.

Figure 6:
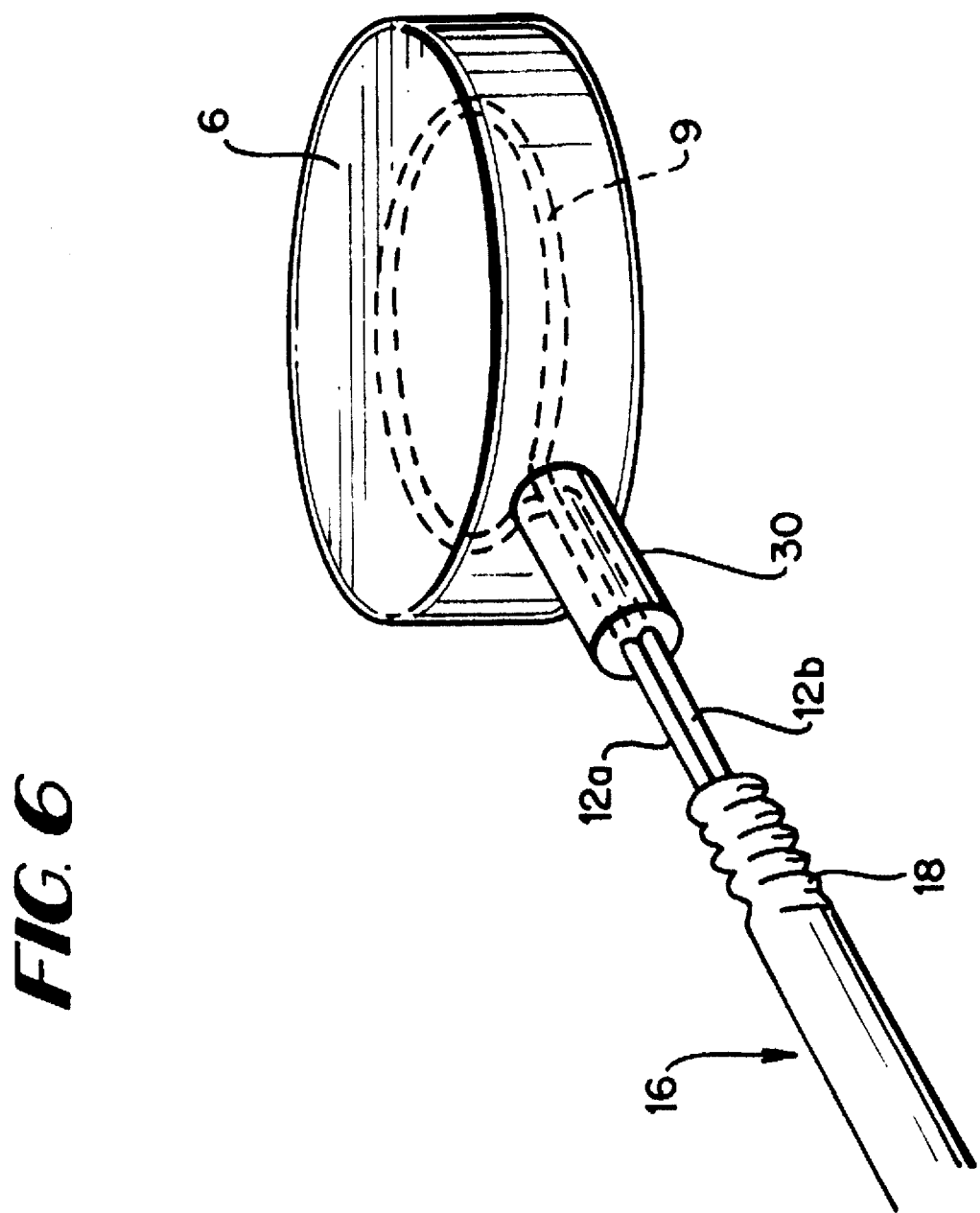
FIG. 6 is a perspective view showing a variant embodiment of the wear indicator of the invention.

In a variant embodiment shown in FIGS. 6, the pellet is provided with a radial rod 30 whose diameter is not greater than the thickness of the slot 24. The pellet 6 and the radial rod 30 are formed by overmoulding on the loop 9 and on the two lengths of wire 12a and 12b that extend the loop 9. When the pellet 6 is disposed in the end 21 of the first bore 20, the radial rod 30 is centred in the second bore 22. In this embodiment, the sleeve 14 may advantageously be replaced by the end 18 of the resilient sheath 16 which is received in the second bore 22, holding the radial rod 30 captive. This disposition makes it possible to hold the pellet 6 accurately in the end 21 of the first bore 20.

We claim:

1. A brake pad for a vehicle brake, the pad comprising a friction lining (2) and a wear indicator (5) fixed by fixing means, said indicator (5) comprising a body (6) of insulating material and an electrical conductor (10) designed to be connected to an electrical indicator circuit, a portion (9) of said conductor (10) being disposed in said body (6) in such a manner that it is itself worn by a rotary part of the brake once the friction lining (2) has been reduced to a thickness of less than a predetermined value, the brake pad being characterised by the fact that the body (6) is shaped to be received in the bottom of a first blind bore (20) formed in the friction lining (2) and opening out into the braking face (4) of said lining, by the fact that the means for fixing the indicator (5) on said lining (2) comprise a rigid sleeve (14) slidably mounted on the electrical conductor (10) in the vicinity of said body (6) and suitable for being received in a second bore (22) formed in said lining (2) and opening out into said first bore (20) and to one of the edges (23) of the lining (2), and by the fact that a slot (24) is provided in the friction lining to pass the electrical conductor (10) during installation of the wear indicator (5) on said lining (2), said slot (24) being narrower than the diameter of the sleeve (14) and extending between said first bore (20), said second bore (22), said edge (23), and said braking face (4).

2. A brake pad according to claim 1, characterised by the fact that means are provided for holding the sleeve in the second bore (22).

3. A brake pad according to claim 2, characterised by the fact that the free end of the electrical conductor (10) includes a plug (15) for connection to the electrical indicator circuit, and by the fact that the means for holding the sleeve (14) in the second bore (22) comprise a resilient sheath (16) capable of sliding over the electrical conductor and of exerting on said sleeve (14) a force (F) that is directed towards the body (6).

4. A brake pad according to claim 3, characterised by the fact that sleeve (14) is inserted in one end of said resilient sheath (16).

5. A brake pad according to claim 1, characterised by the fact that the body (6) is in the form of a pellet (6).

6. A brake pad according to claim 5, characterised by the fact that the pellet (6) has an annular groove (8) in its edge (7), and by the fact that the electrical conductor (20) is an insulated conductor wire forming a loop that is received in said groove (8).

7. A brake pad according to claim 6, characterised by the fact that the pellet (6) includes, in its edge (7), a recess (13) adapted to receive the inner end (19) of the sleeve (14).

8. A brake pad according to claim 1, characterised by the fact that the body is in the form of a pellet (6) provided with a radial rod (30) whose diameter is no greater than the thickness of the slot (24), said pellet (6) and said rod (30) being formed by being moulded over a portion (9, 12a, 12b) of the electrical conductor (10).

9. A brake pad according to claim 8, characterised by the fact that the sleeve is constituted by the end (18) of a resilient sheath (16).

* * * * *